United States Patent
Patil et al.

(10) Patent No.: US 12,229,049 B2
(45) Date of Patent: Feb. 18, 2025

(54) DETERMINING CACHING PARAMETER METRICS FOR CACHING DATA ELEMENTS

(71) Applicant: International Business Machines Corporation

(72) Inventors: Madhusmita Patil, Hyderabad (IN); Harish Bharti, Pune (IN); Siddhartha Sood, Ghaziabad (IN); Shweta Vohra, Farnborough (GB)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 18/336,154

(22) Filed: Jun. 16, 2023

(65) Prior Publication Data

US 2024/0419592 A1 Dec. 19, 2024

(51) Int. Cl.
*G06F 12/0815* (2016.01)

(52) U.S. Cl.
CPC ................ *G06F 12/0815* (2013.01)

(58) Field of Classification Search
CPC .................................................. G06F 12/0815
See application file for complete search history.

(56) References Cited

U.S. PATENT DOCUMENTS

| | | | |
|---|---|---|---|
| 8,965,819 B2 | 2/2015 | Tirunagari | |
| 9,563,385 B1 | 2/2017 | Kowalski et al. | |
| 10,812,846 B1* | 10/2020 | Vantalon | ............ H04N 21/2408 |
| 2005/0240732 A1* | 10/2005 | Crick | ................... G06F 16/9574 |
| | | | 707/E17.12 |
| 2016/0117254 A1 | 4/2016 | Susarla et al. | |
| 2016/0378666 A1* | 12/2016 | Amrhein | ............. G06F 12/0857 |
| | | | 709/213 |
| 2018/0024924 A1 | 1/2018 | Winkler | |
| 2019/0155736 A1 | 5/2019 | Hagersten et al. | |
| 2022/0114108 A1 | 4/2022 | Koker et al. | |

FOREIGN PATENT DOCUMENTS

WO    WO-2013105960 A1 *   7/2013   ......... G06F 12/0246

OTHER PUBLICATIONS

"Caching Best Practices," copyright 2023, Amazon Web Services, accessed Jun. 7, 2023, 10 pages. https://aws.amazon.com/caching/best-practices/.

(Continued)

*Primary Examiner* — Aracelis Ruiz
(74) *Attorney, Agent, or Firm* — Yee & Associates, P.C.

(57) ABSTRACT

Managing data element caching is provided. Non-functional requirements of a system running an application are mapped to resource utilization and system performance metric values corresponding to each of a plurality of caching parameters for each of data elements corresponding to the application suitable for caching. A caching decision is generated for each of the data elements corresponding to the application suitable for caching by identifying certain ones of the data elements for the caching to improve at least one of performance and throughput of the system based on the mapping. A data element caching decision recommendation is generated for the application based on the caching decision. The data element caching decision recommendation corresponding to the application is output to a client device of a customer via a network.

20 Claims, 7 Drawing Sheets

(56) References Cited

OTHER PUBLICATIONS

"Working with Java Object Cache," Oracle9iAS Containers for J2EE Services Guide, Release 2 (9.0.3), Part No. A97690-01, copyright 1996, 2002, Oracle Corporation, accessed Jun. 7, 2023, 37 pages. https://docs.oracle.com/cd/A97688_16/generic.903/a97690/objcache.htm.

Erman et al., "To Cache or not to Cache: The 3G case," IEEE Internet Computing, vol. 15, Issue 2, Mar.-Apr. 2011, 6 pages. https://math.mit.edu/~hajiagha/InternetComputing.pdf.

Huskin, "Types of Data Caching for Different Business Use Cases," Transforming Data with Intelligence, Feb. 16, 2021, copyright 2023, TDWI, accessed Jun. 7, 2023, 7 pages. https://tdwi.org/articles/2021/02/16/arch-all-types-of-data-caching.aspx.

Johnson, "What is a cache? A complete guide to caches and their important uses on your computer, phone, and other devices," Business Insider, Jul. 7, 2020, copyright 2023, Times Internet Limited, Times Syndication Service, accessed Jun. 7, 2023, 48 pages. https://www.businessinsider.in/tech/how-to/what-is-a-cache-a-complete-guide-to-caches-and-their-important-uses-on-your-computer-phone-and-other-devices/articleshow/76837123.cms.

Nath, "All things caching—use cases, benefits, strategies, choosing a caching technology, exploring some popular products," DataDrivenInvestor, Dec. 1, 2018, accessed Jun. 7, 2023, 35 pages. https://medium.datadriveninvestor.com/all-things-caching-use-cases-benefits-strategies-choosing-a-caching-technology-exploring-fa6c1f2e93aa.

Park et al., "CCA: Cost-Capacity-Aware Caching for In-Memory Data Analytics Frameworks," Sensors 2021, vol. 21, Apr. 2021, 18 pages. https://www.ncbi.nlm.nih.gov/pmc/articles/PMC8036346/.

Rayburn, "When It Comes to Cache Hit Ratio and CDNs, the Devil Is in the Details," Jun. 20, 2017, Streaming Media Blog, accessed Jun. 7, 2023, 11 pages. https://www.streamingmediablog.com/2017/06/cache-hit-ratios.html.

Tsigkari et al., "User-centric optimization of caching and recommendations in edge cache networks," 2020 IEEE 21st International Symposium on "A World of Wireless, Mobile and Multimedia Networks (WoWMoM)," Aug. 31-Sep. 3, 2020, Cork, Ireland, 10 pages. https://ieeexplore.ieee.org/document/9217737.

Wu et al., "PackCache: An Online Cost-driven Data Caching Algorithm in the Cloud," IEEE Transactions on Computers, vol. 72, Issue 4, Apr. 1, 2023, 9 pages. https://arxiv.org/pdf/2207.09035.pdf.

* cited by examiner

CACHING MANAGEMENT GRAPH 400

| CACHING PARAMETERS | RESOURCE UTILIZATION METRIC VALUE | SYSTEM PERFORMANCE METRIC VALUE | EXAMPLE FEEDBACK USE CASE | EXAMPLE SAMPLE DATA | HOW CALCULATED? |
|---|---|---|---|---|---|
| RESOURCE UTILIZATION FOR CACHING (e.g., IN-MEMORY CACHING) | | | DATA ELEMENT SIZE PER USER / TRANSACTION | | |
| CACHING PARAMETER FREQUENCY OF USAGE | | | | EXAMPLE: HOW MANY TIMES API IS EXECUTED TO GET CACHED DATA ELEMENT | DETERMINE WHICH CACHING PARAMETERS ARE LEAST USED USING AN ALGORITHM (e.g., LEAST FREQUENTLY USED ALGORITHM) |
| CACHED DATA VOLATILITY (e.g., FREQUENCY OF DATA CHANGES IN CACHE) | | | | | ANALYZE AUDIT LOGS OF SYSTEM |
| DIRTY READ TOLERANCE | | | | EXAMPLE: NEW TRANSACTION JUST OCCURRED IN SYSTEM | DEFINED BASED ON BUSINESS RULES OR BUSINESS SME INPUT |
| CACHE REFRESH OVERHEAD (INCLUDING INITIAL LOAD) | | | | | |

FIG. 4

DETERMINING CACHING PARAMETER METRICS FOR CACHING DATA ELEMENTS

BACKGROUND

The disclosure relates generally to caching and more specifically to managing the caching of data elements.

A cache is a hardware or software component that stores data so that future requests for that data can be fulfilled faster. In other words, a cache is a special storage space for temporary data that makes an application, browser, or device run faster and more efficiently. For example, after accessing an application or website for the first time, a cache stores needed data, files, images, or the like on the system accessing the application or website. The system utilizes this cached data to quickly load the application or website upon each subsequent access.

SUMMARY

According to one illustrative embodiment, a computer-implemented method for managing data element caching is provided. A computer maps non-functional requirements of a system running an application to resource utilization and system performance metric values corresponding to each of a plurality of caching parameters for each of data elements corresponding to the application suitable for caching in response to performing an automated code analysis of the application. The computer generates a caching decision for each of the data elements corresponding to the application suitable for the caching by identifying certain ones of the data elements for the caching to improve at least one of performance and throughput of the system based on the mapping of the non-functional requirements of the system running the application to the resource utilization and system performance metric values corresponding to each of the plurality of caching parameters for each of the data elements. The computer generates a data element caching decision recommendation for the application based on the caching decision identifying the certain ones of the data elements for the caching to improve the at least one of the performance and the throughput of the system. The computer outputs the data element caching decision recommendation corresponding to the application identifying the certain ones of the data elements for the caching to improve the at least one of the performance and the throughput of the system to a client device of a customer via a network. According to other illustrative embodiments, a computer system and computer program product for managing data element caching are provided.

BRIEF DESCRIPTION OF THE DRAWINGS

FIG. 4 is a diagram illustrating an example of a cache management graph in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 1:
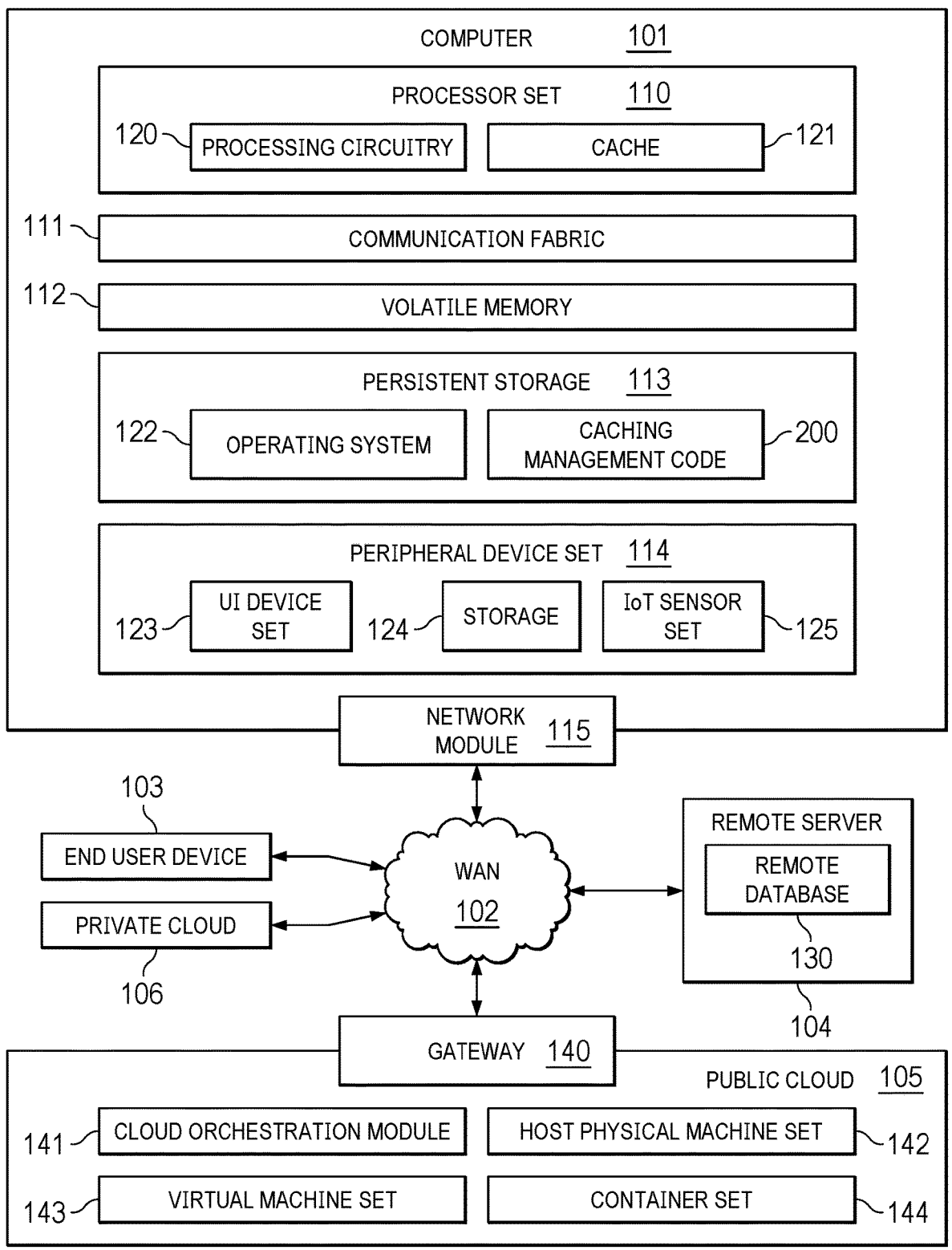
FIG. 1 is a pictorial representation of a computing environment in which illustrative embodiments may be implemented.
Figure 2:
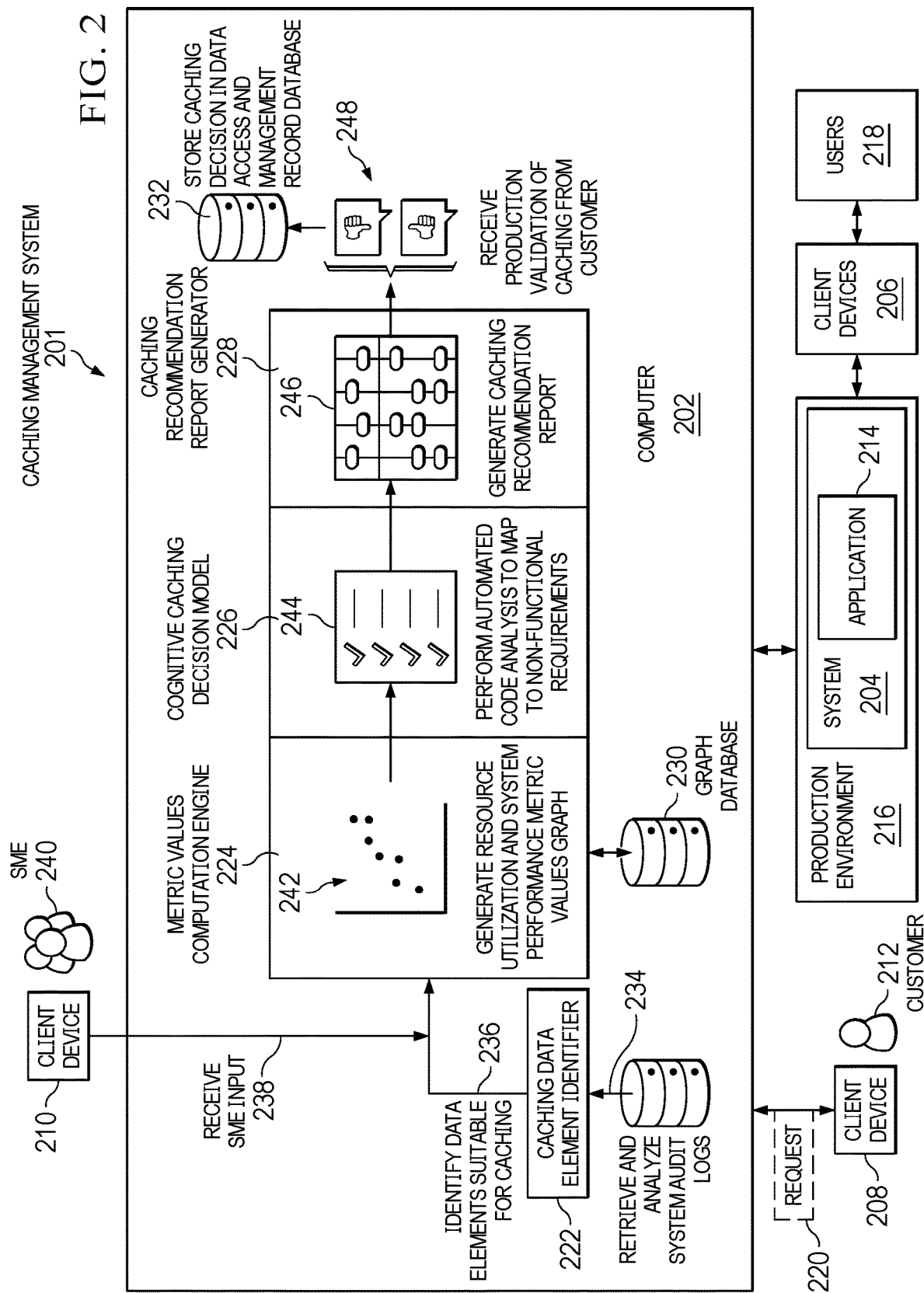
FIG. 2 is a diagram illustrating an example of a cache management system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as caching management code 200. For example, caching management code 200 determines resource utilization and system performance metric values for respective caching parameters when determining which data elements corresponding to an application running on a system in a production environment to cache to improve at least one of performance and throughput of the system. As used herein in the context of data caching, "data elements" refer to the individual pieces of data that are stored and retrieved from the cache. These data elements can be any unit of information that is relevant to the application and can be cached for improved system performance and throughput. Data elements can vary depending on the specific application and its needs. For example, data elements can include various types of data such as database query results, API responses, session data, configuration data, lookup tables, and the like.

In addition to caching management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and caching management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in caching management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The cache management code included in block 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, touchpad, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (for example, a customer of the caching management services provided by computer 101), and may take any of the forms discussed above in connection with computer 101. EUD 103 typically receives helpful and useful data from the operations of computer 101. For example, in a hypothetical case where computer 101 is designed to provide a data element caching recommendation to the end user, this data element caching recommendation would typically be communicated from network module 115 of computer 101 through WAN 102 to EUD 103. In this way, EUD 103 can display, or otherwise present, the data element caching recommendation to the end user. In some embodiments, EUD 103 may be a client device, such as thin client, heavy client, mainframe computer, desktop computer, laptop computer, tablet computer, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a data element caching recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Typically, a cache is a hardware or software component that stores data so that future requests for that data can be delivered faster. For example, enterprise applications running in a production environment typically utilize in-memory caching. In-memory caching is a mechanism for improving system performance by avoiding performance-intensive Input/Output operations during user-requested processing. However, data caching not only comes with a significant resource utilization overhead (e.g., caching data elements for millions of users), but also can degrade system performance in several use case scenarios (e.g., data that are frequently changing and the users need to see or utilize the latest data).

Currently, the decision as to which data to cache and which data not to cache has been subjective and subject matter expert dependent. Generally, system performance architects make this data caching decision based on qualitative analysis. However, in reality system performance architect assumptions and caching parameters keep changing depending on which data to be cached will be beneficial to the users.

Currently, no solution exists that makes a data-based decision on which data elements corresponding to a particular application running on a system in a production environment to cache in memory of the system by taking into account resource utilization and system performance associated with each respective caching parameter of a plurality of caching parameters for each respective data element and then continuously evaluating the usefulness or practicality of caching those particular data elements.

For example, a customer deploys an application in a production environment. The customer determines that the application is not performing according to expectations (e.g., application is not meeting service level agreements). In response to receiving a request from the customer, illustrative embodiments optimize selection of data elements corresponding to the application to cache in memory to improve at least one of performance and throughput of the system running the application based on, for example, analyzing audit logs of the system.

Audit logs record changes within the system, providing a complete record of the system's operations. For example, audit logs capture events by recording information such as who performed an activity, what activity was performed, and how the system responded. Therefore, users, such as, for example, system administrators, subject matter experts, program developers, or the like, can use the audit logs to diagnose and troubleshoot system issues, identify suspicious activity, modify application code, or the like.

When a plurality of different user journeys (e.g., multiple users are logged in to an application running on a system in a production environment and are performing transactions) are utilizing the same underlying system infrastructure for data caching, depending on the data access patterns of each particular user journey, illustrative embodiments can provide higher priority to certain user journeys and cache data for those certain user journeys as opposed to other user journeys based on illustrative embodiments determining resource utilization and system performance metric values corresponding to respective caching parameters. For example, data access patterns change over time and, therefore, the data in the cache are dynamic and represent what a particular user journey needs at a given point in time. Thus, illustrative embodiments optimize selection of which data elements to cache to decrease resource utilization and increase system performance and throughput.

Illustrative embodiments implement a logistic regression model in a metric values computation engine to determine metric values for each of the caching parameters. Independent variables include, for example, cache refresh overhead, dirty read tolerance, cached data volatility, and the like. The dependent variable determines whether a particular caching parameter should be used or not to make a caching decision based on its corresponding metric values. Illustrative embodiments determine the metric values for each respective caching parameter using the following equation:

$$\text{Caching Parameter Metric Value} = q(\text{cache refresh overhead}*n + \text{dirty read tolerance}*m + \text{cached data volatility}*p)*x,$$

where "q" is the frequency of usage of that particular caching parameter, "n", "m", and "p" are different user configurable weight values, and "x" is the resource utilization of in-memory caching.

Illustrative embodiments also implement a binary decision model in the metric values computation engine to determine the usability of each respective caching parameter as related to system performance and throughput based on the determined metric values corresponding to that particular caching parameter. The independent variable is performance of that particular caching parameter and the dependent variable determines whether that particular caching parameter should be used to make a caching decision based on system performance and throughput. As an example, illustrative embodiments determine that throughput is a performance gain as a measure of at least one of improved system performance or improved system throughput based on the determined metric values corresponding to a particular caching parameter. As a result, in this example, throughput equates to at least one of improved system performance or improved system throughput. Thus, illustrative embodiments determine whether each respective caching parameter improves at least one of system performance or system throughput.

Furthermore, based on the context of the application, illustrative embodiments utilize the metric values computation engine to assign a user-defined priority to performance and throughput for each respective caching parameter. For example, system throughput may be a higher priority for users making stock trades when timing is a factor. In contrast, system performance may be a higher priority for users when making decisions regarding, for example, healthcare while reviewing patient records. In other words, the priority can be based on user needs. Alternatively, the priority can be based on business rules. Illustrative embodiments utilize the assigned priority for performance and throughput to determine a priority score for each respective caching parameter. Illustrative embodiments then generate a list of caching parameters specific to that particular application, where each caching parameter in the list is ranked according to its corresponding priority score from highest priority to lowest.

Moreover, illustrative embodiments utilize a cognitive caching decision model to perform an automated code analysis of the application to map non-functional requirements of the system running the application to the resource utilization and system performance metric values of respective caching parameters in the list for each data element corresponding to the application. A non-functional requirement is a requirement that specifies criteria that can be used to evaluate the operation of a system, rather than specific behaviors. Non-functional requirements are contrasted with functional requirements that define specific behavior or functions. Functional requirements implementation is detailed in system design. Non-functional requirements implementation is detailed in system architecture because non-functional requirements are usually architecturally significant requirements. The system may be required to present a user with a display of the number of data elements in the cache. This is an example of a functional requirement. How current the number of data elements needs to be in the cache is an example of a non-functional requirement.

Illustrative embodiments then utilize the cognitive caching decision model to generate a caching decision for each data element corresponding to the application based on the mapping of the non-functional requirements of the system running the application to the resource utilization and system performance metric values of the respective caching parameters for each data element. In other words, illustrative embodiments determine which data elements corresponding to the application are to be cached and which are not. Thus, illustrative embodiments provide a data-based caching decision as to which data elements to cache in memory of the system running the application.

Also, it should be noted that the cognitive caching decision model can utilize a decision tree algorithm to make the caching decision. For example, the cognitive caching decision model can utilize the decision tree algorithm to divide the set of data elements corresponding to the application into a plurality of smaller subsets of data elements, while at the same time incrementally building a decision tree. The decision tree consists of nodes, which test for the value of a data element, edges, which correspond to the outcome of a test and connect to a node to the next node or leaf node, and leaf nodes or terminal nodes, which predict a data element caching decision outcome, making the decision tree a complete structure.

Afterward, illustrative embodiments generate a data element caching decision recommendation for the application. Illustrative embodiments output the data element caching decision recommendation corresponding to the application to the customer. In addition, illustrative embodiments can optionally implement the data element caching decision recommendation corresponding to the application automatically in the system running the application in the production environment. Further, illustrative embodiments receive production validation feedback regarding the data element caching decision recommendation from the customer after implementation. Furthermore, in response to receiving negative production validation feedback from the customer regarding the implementation of the data element caching decision recommendation in the production environment, illustrative embodiments can highlight portions of the system audit logs where potential issues may exist so that a program developer can review the highlighted portions to determine possible code rebuild of the application. Alternatively, illustrative embodiments can reevaluate the resource utilization and system performance metric values of the caching parameters and generate a new data element caching decision for the application.

Thus, illustrative embodiments provide one or more technical solutions that overcome a technical problem with an inability of current solutions to determine which data elements to cache or not to cache to improve system performance and throughput. As a result, these one or more technical solutions provide a technical effect and practical application in the field of data caching.

With reference now to FIG. 2, a diagram illustrating an example of a caching management system is depicted in accordance with an illustrative embodiment. Caching management system 201 may be implemented in a computing environment, such as computing environment 100 in FIG. 1. Caching management system 201 is a system of hardware and software components for determining resource utilization and system performance metric values for respective caching parameters when determining which data elements corresponding to an application running on a system in a production environment to cache to improve at least one of performance and throughput of the system.

In this example, caching management system 201 includes computer 202, system 204, client devices 206, client device 208, and client device 210. Computer 202 may be, for example, computer 101 in FIG. 1. System 204 may be, for example, a server in host physical machine set 142 or virtual machine set 143 in FIG. 1. Each of client devices 206, client device 208, and client device 210 may be similar to, for example, EUD 103 in FIG. 1. However, it should be noted that caching management system 201 is intended as an example only and not as a limitation on illustrative embodiments. For example, caching management system 201 may include any number of computers, systems, client devices, and other devices and components not shown.

In this example, customer 212 determines that application 214 running on system 204 in production environment 216 is not performing as expected based on, for example, service level agreement. Customer 212 is a customer of the caching management services provided by computer 202. Application 214 provides a set of services to users 218 via client devices 206. The set of services provided by application 214 may be any type of services, such as, for example, banking services, financial services, healthcare services, educational services, governmental services, business services, insurance services, entertainment services, or the like. Production environment 216 may be located in a cloud, such as, for example, public cloud 105 in FIG. 1.

In response to customer 212 determining that application 214 is experiencing lower performance, customer 212 sends request 220 to computer 202 using client device 208. Request 220 is a request to improve at least one of performance and throughput of system 204 based on selective caching of certain data elements corresponding to application 214 on system 204.

In this example, computer 202 includes caching data element identifier 222, metric values computation engine 224, cognitive caching decision model 226, caching recommendation report generator 228, graph database 230, and data access and management record database 232. At 234, in response to computer 202 receiving request 220 from customer 212 via client device 208, caching data element identifier 222 retrieves and analyzes system audit logs corresponding to system 204. At 236, based on the analysis of the system audit logs corresponding to system 204, caching data element identifier 222 identifies a set of data elements corresponding to application 214 suitable for caching.

Optionally, at 238, computer 202 receives subject matter expert (SME) input from SME 240 via client device 210. SME 240 may be, for example, an SME corresponding to a particular domain, such as, for example, a business domain, banking domain, financial domain, healthcare domain, education domain, government domain, entertainment domain, insurance domain, or the like. The SME input received from SME 240 may be, for example, a plurality of different configurable weights assigned to a plurality of different caching parameters, such as, for example, cache refresh overhead, dirty read tolerance, cached data volatility, caching resource utilization, frequency of caching parameter usage, maintenance overhead, and the like. In addition, the input received from SME 240 may include, for example, an assigned priority value to performance of system 204 and an assigned priority value to throughput of system 204. For example, SME 240 may assign a higher priority value to throughput as opposed to performance based on, for example, needs of users 218, business rules, or the like, when application 214 is providing a stock quote and trading service to users 218. Conversely, SME 240 may assign a higher priority value to performance as opposed to throughput when, for example, application 214 is providing an entertainment service to users 218.

At 242, in response to receiving the set of data elements corresponding to application 214 suitable for caching and optionally the SME input, metric values computation engine 224 generates a resource utilization and system performance metric values graph based on the analysis of the audit logs corresponding to the system running the application and optionally on the SME input. The resource utilization and system performance metric values graph identifies the resource utilization and system performance metric values corresponding to each of the plurality of different caching parameters for each of the set of data elements suitable for caching. Metric values computation engine 224 stores the resource utilization and system performance metric values graph corresponding to system 204 in graph database 230 for future reference. In addition, metric values computation engine 224 sends the resource utilization and system performance metric values graph corresponding to system 204 to cognitive caching decision model 226.

At 244, cognitive caching decision model 226 performs an automated code analysis of application 214 to map the non-functional requirements of system 204 to the resource utilization and system performance metric values corresponding to each of the plurality of different caching parameters for each of the set of data elements suitable for caching identified in the graph. Based on the mapping and optionally on the SME input, cognitive caching decision model 226 generates a caching decision for each of the set of data elements by identifying a selected subset of data elements from the set of data elements for caching to improve at least one of performance and throughput of system 204. Further, cognitive caching decision model 226 sends the caching decision to caching recommendation report generator 228.

At 246, caching recommendation report generator 228 generates a caching recommendation report based on the caching decision generated by cognitive caching decision model 226. Caching recommendation report generator 228 outputs the caching recommendation report, which includes the caching decision to only cache the selected subset of data elements to improve at least one of performance and throughput of system 204, to customer 212 via client device 208 for review and implementation. Alternatively, or optionally, computer 202 can automatically implement the caching decision.

Subsequently, at 248, computer 202 receives production validation of the caching decision from customer 212 via client device 208 after implementation of the caching decision on system 204. Computer 202 stores the caching decision and production validation in data access and management record database 232 for future reference.

Figure 3:
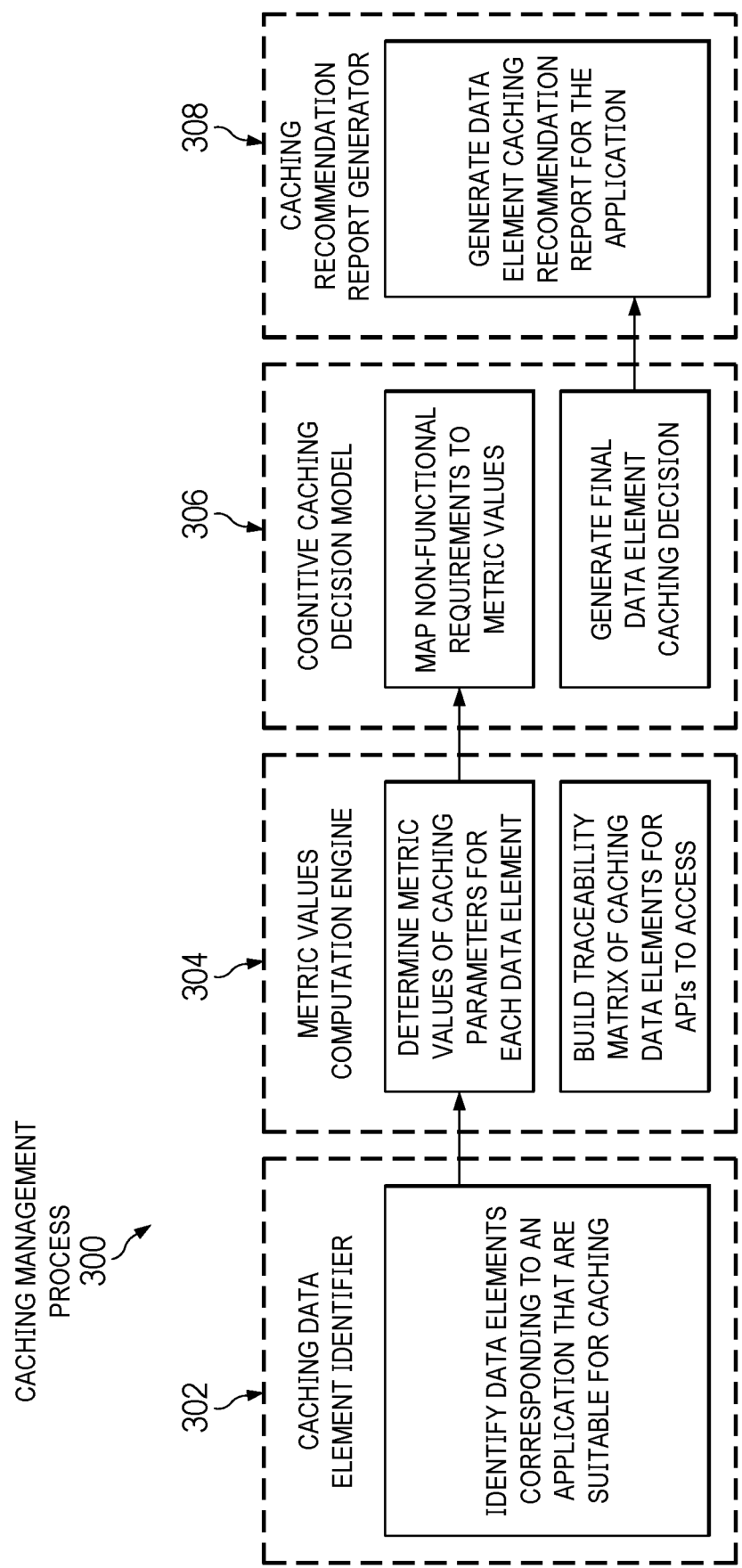
FIG. 3 is a diagram illustrating an example of a cache management process in accordance with an illustrative embodiment.

With reference now to FIG. 3, a diagram illustrating an example of a cache management process is depicted in accordance with an illustrative embodiment. Cache management process 300 can be implemented in a computer, such as, for example, computer 101 in FIG. 1 or computer 202 in FIG. 2. For example, cache management process 300 can be implemented by caching management code 200 in FIG. 1.

In this example, cache management process 300 includes caching data element identifier 302, metric values computation engine 304, cognitive caching decision model 306, and caching recommendation report generator 308. Caching data element identifier 302, metric values computation engine 304, cognitive caching decision model 306, and caching recommendation report generator 308 may be, for example, caching data element identifier 222, metric values computation engine 224, cognitive caching decision model 226, and caching recommendation report generator 228 in FIG. 2. However, it should be noted that cache management process 300 is intended as an example only and not as a limitation on illustrative embodiments. For example, cache management process 300 may include more or fewer components than shown. In other words, a shown component can be divided into two or more components, two or more shown components can be combined into one component, a component not shown can be added, or a shown component can be removed.

In this example, caching data element identifier 302 identifies data elements corresponding to an application, such as, for example, application 214 in FIG. 2, that are suitable for caching. Metric values computation engine 304 determines metric values, such as, for example, resource utilization and system performance metric values, of caching parameters for each of the identified data elements. In addition, metric values computation engine 304 builds a traceability matrix of caching data elements for application programming interfaces to access. Cognitive caching decision model 306 maps non-functional requirements of a system running the application, such as, for example, system 204 in FIG. 2, to the determined metric values for each of the identified data elements. Further, cognitive caching decision model 306 generates a final data element caching decision for the application to improve the performance and throughput of the system running the application based on the mapping. Caching recommendation report generator 308 generates a data element caching recommendation report for the application based on the final data element caching decision.

With reference now to FIG. 4, a diagram illustrating an example of a cache management graph is depicted in accordance with an illustrative embodiment. Cache management graph 400 can be implemented in a computer, such as, for example, computer 101 in FIG. 1 or computer 202 in FIG. 2. For example, cache management graph 400 can be implemented by caching management code 200 in FIG. 1. Cache management graph 400 may be, for example, the resource utilization and system performance metric values graph generated at 242 in FIG. 2.

In this example, cache management graph 400 includes caching parameters 402, resource utilization metric value 404, system performance metric value 406, example feedback use case 408, example sample data 410, and how calculated 412. However, it should be noted that cache management graph 400 is intended as an example only and not as a limitation on illustrative embodiments. For example, cache management graph 400 may include more caching parameters and information than shown.

Figure 5A:
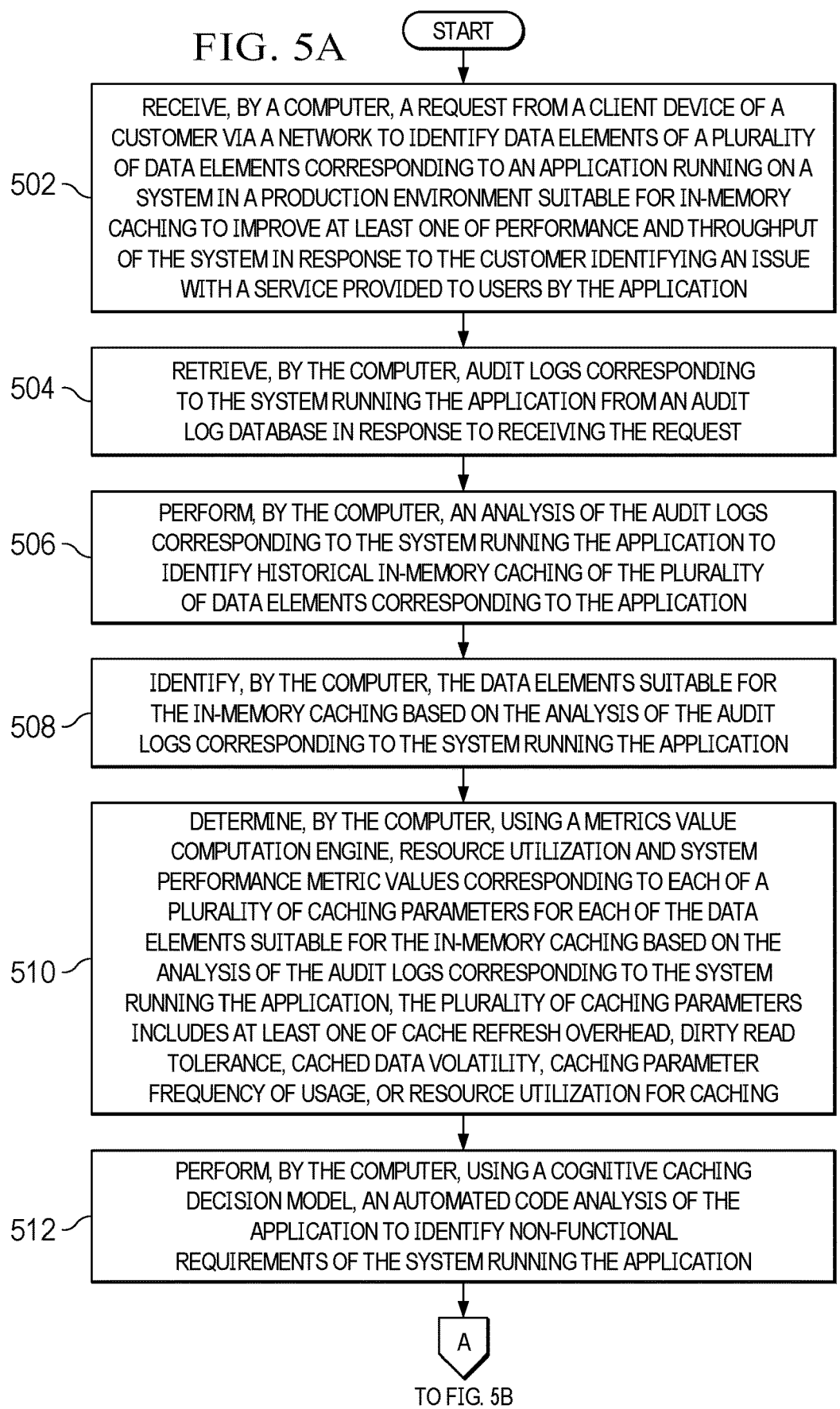
FIGS. 5A-5C are a flowchart illustrating a process for managing data element caching in accordance with an illustrative embodiment.
Figure 5B:
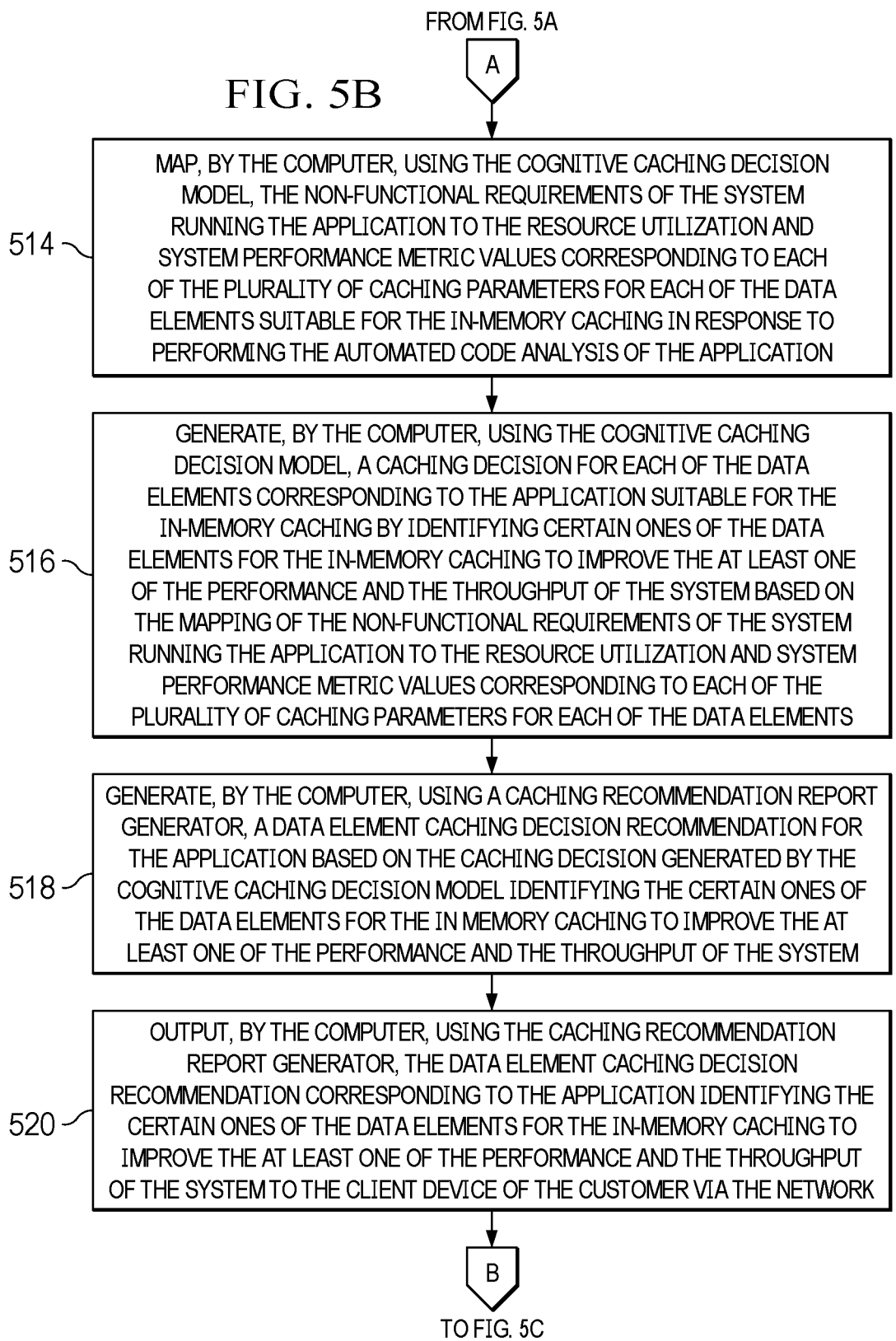
Figure 5C:
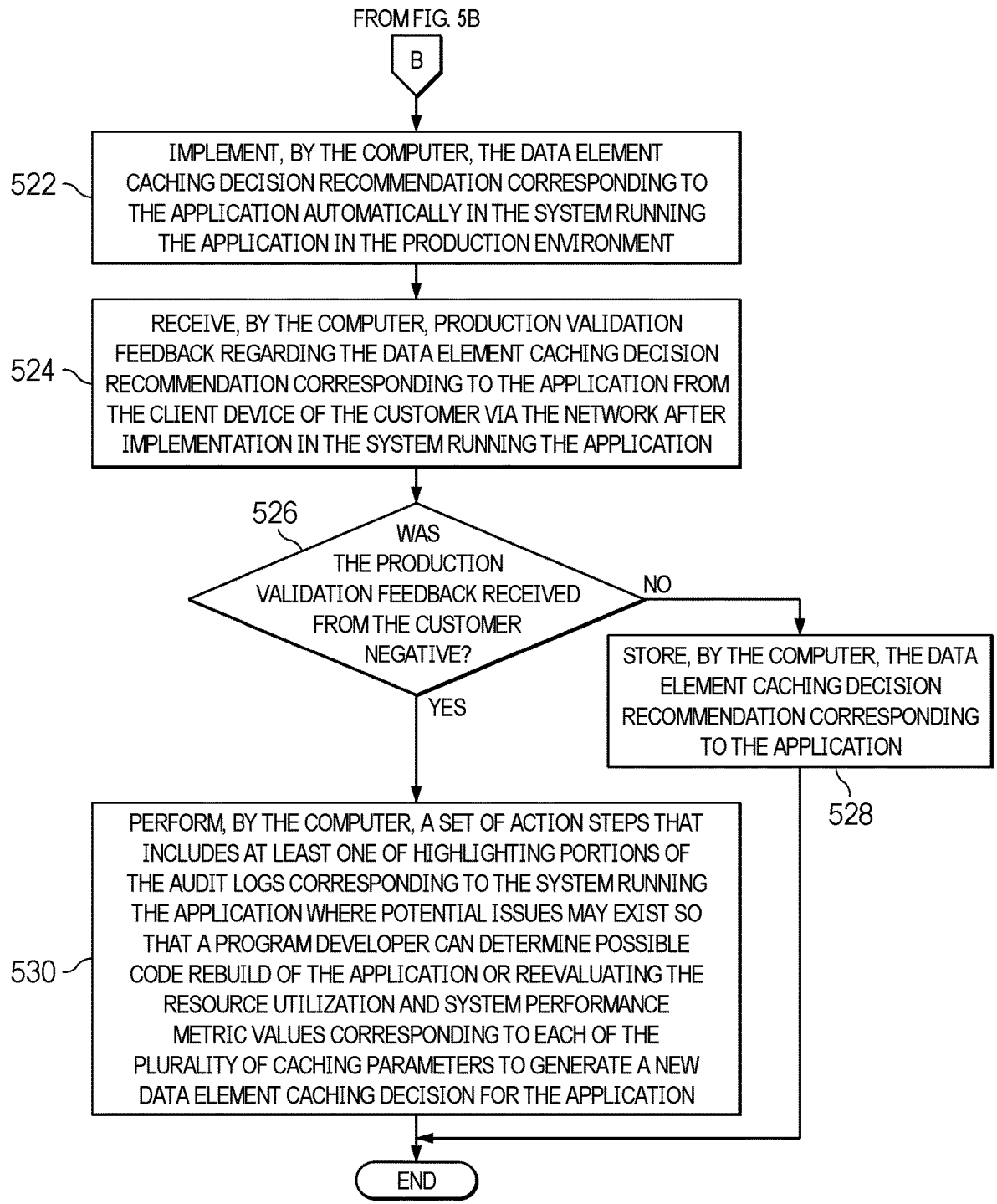

With reference now to FIGS. 5A-5C, a flowchart illustrating a process for managing data element caching is shown in accordance with an illustrative embodiment. The process shown in FIGS. 5A-5C may be implemented in a computer, such as, for example, computer 101 in FIG. 1 or computer 202 in FIG. 2. For example, the process shown in FIGS. 5A-5C may be implemented by caching management code 200 in FIG. 1.

The process begins when the computer receives a request from a client device of a customer via a network to identify data elements of a plurality of data elements corresponding to an application running on a system in a production environment suitable for in-memory caching to improve at least one of performance and throughput of the system in response to the customer identifying an issue with a service provided to users by the application (step 502). The computer retrieves audit logs corresponding to the system running the application from an audit log database in response to receiving the request (step 504).

The computer performs an analysis of the audit logs corresponding to the system running the application to identify historical in-memory caching of the plurality of data elements corresponding to the application (step 506). The computer identifies the data elements suitable for the in-memory caching based on the analysis of the audit logs corresponding to the system running the application (step 508).

The computer, using a metrics value computation engine, determines resource utilization and system performance metric values corresponding to each of a plurality of caching parameters for each of the data elements suitable for the in-memory caching based on the analysis of the audit logs corresponding to the system running the application (step 510). The plurality of caching parameters includes at least one of cache refresh overhead, dirty read tolerance, cached data volatility, caching parameter frequency of usage, or resource utilization for caching. The computer, using a cognitive caching decision model, performs an automated code analysis of the application to identify non-functional requirements of the system running the application (step 512).

The computer, using the cognitive caching decision model, maps the non-functional requirements of the system running the application to the resource utilization and system performance metric values corresponding to each of the plurality of caching parameters for each of the data elements suitable for the in-memory caching in response to performing the automated code analysis of the application (step 514). The computer, using the cognitive caching decision model, generates a caching decision for each of the data elements corresponding to the application suitable for the in-memory caching by identifying certain ones of the data elements for the in-memory caching to improve the at least one of the performance and the throughput of the system based on the mapping of the non-functional requirements of the system running the application to the resource utilization and system performance metric values corresponding to each of the plurality of caching parameters for each of the data elements (step 516).

The computer, using a caching recommendation report generator, generates a data element caching decision recommendation for the application based on the caching decision generated by the cognitive caching decision model identifying the certain ones of the data elements for the in-memory caching to improve the at least one of the performance and the throughput of the system (step 518). The computer, using the caching recommendation report generator, outputs the data element caching decision recommendation corresponding to the application identifying the certain ones of the data elements for the in-memory caching to improve the at least one of the performance and the throughput of the system to the client device of the customer via the network (step 520).

Optionally, the computer implements the data element caching decision recommendation corresponding to the application automatically in the system running the application in the production environment (step 522). Subsequently, the computer receives production validation feedback regarding the data element caching decision recommendation corresponding to the application from the client device of the customer via the network after implementation in the system running the application (step 524).

The computer makes a determination as to whether the production validation feedback received from the customer was negative (step 526). If the computer determines that the production validation feedback received from the customer was not negative, no output of step 526, then the computer stores the data element caching decision recommendation corresponding to the application in a data access and management record database (step 528). Thereafter, the process terminates. If the computer determines that the production validation feedback received from the customer was negative, yes output of step 526, then the computer performs a set of action steps that includes at least one of highlighting portions of the audit logs corresponding to the system running the application where potential issues may exist so that a program developer can determine possible code rebuild of the application or reevaluating the resource utilization and system performance metric values corresponding to each of the plurality of caching parameters to generate a new data element caching decision for the application (step 530). Thereafter, the process terminates.

Thus, illustrative embodiments of the present disclosure provide a computer-implemented method, computer system, and computer program product for managing data element caching. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing data element caching, the computer-implemented method comprising:
    mapping, by a computer, non-functional requirements of a system running an application to resource utilization and system performance metric values corresponding to each of a plurality of caching parameters for each of data elements corresponding to the application suitable for caching in response to performing an automated code analysis of the application;
    generating, by the computer, a caching decision for each of the data elements corresponding to the application suitable for caching by identifying certain ones of the data elements for caching to improve at least one of performance and throughput of the system based on the mapping of the non-functional requirements of the system running the application to the resource utilization and system performance metric values corresponding to each of the plurality of caching parameters for each of the data elements;
    generating, by the computer, a data element caching decision recommendation for the application based on the caching decision identifying the certain ones of the data elements for caching to improve the at least one of the performance and the throughput of the system; and
    outputting, by the computer, the data element caching decision recommendation corresponding to the application identifying the certain ones of the data elements for caching to improve the at least one of the performance and the throughput of the system to a client device of a customer via a network.

2. The computer-implemented method of claim 1, further comprising:
    receiving, by the computer, production validation feedback regarding the data element caching decision recommendation corresponding to the application from the client device of the customer via the network after implementation in the system running the application;
    determining, by the computer, whether the production validation feedback received from the customer was negative; and
    storing, by the computer, the data element caching decision recommendation corresponding to the application in a database in response to the computer determining that the production validation feedback received from the customer was not negative.

3. The computer-implemented method of claim 2, further comprising:
    performing, by the computer, a set of action steps that includes at least one of highlighting portions of audit logs corresponding to the system running the application where potential issues exist so that a program developer can determine possible code rebuild of the application or reevaluating the resource utilization and system performance metric values corresponding to each of the plurality of caching parameters to generate a new data element caching decision for the application in response to the computer determining that the production validation feedback received from the customer was negative.

4. The computer-implemented method of claim 1, further comprising:
    receiving, by the computer, a request from the client device of the customer via the network to identify data elements of a plurality of data elements corresponding to the application running on the system in a production environment suitable for caching to improve the at least one of the performance and the throughput of the system in response to the customer identifying an issue with a service provided to users by the application;
    retrieving, by the computer, audit logs corresponding to the system running the application from an audit log database in response to receiving the request; and
    performing, by the computer, an analysis of the audit logs corresponding to the system running the application to identify historical caching of the plurality of data elements corresponding to the application.

5. The computer-implemented method of claim 4, further comprising:
    identifying, by the computer, the data elements suitable for caching based on the analysis of the audit logs corresponding to the system running the application; and
    determining, by the computer, the resource utilization and system performance metric values corresponding to each of the plurality of caching parameters for each of the data elements suitable for caching based on the analysis of the audit logs corresponding to the system running the application.

6. The computer-implemented method of claim 5, wherein the plurality of caching parameters includes at least one of cache refresh overhead, dirty read tolerance, cached data volatility, caching parameter frequency of usage, or resource utilization for caching.

7. The computer-implemented method of claim 1, further comprising:
    performing, by the computer, the automated code analysis of the application to identify the non-functional requirements of the system running the application.

8. The computer-implemented method of claim 1, further comprising:
    implementing, by the computer, the data element caching decision recommendation corresponding to the application automatically in the system running the application in a production environment.

9. The computer-implemented method of claim 1, wherein caching is in-memory caching in the system running the application in a production environment.

10. A computer system for managing data element caching, the computer system comprising:
    a communication fabric;
    a storage device connected to the communication fabric, wherein the storage device stores program instructions; and
    a processor connected to the communication fabric, wherein the processor executes the program instructions to:
        map non-functional requirements of a system running an application to resource utilization and system performance metric values corresponding to each of a plurality of caching parameters for each of data elements corresponding to the application suitable for caching in response to performing an automated code analysis of the application;
        generate a caching decision for each of the data elements corresponding to the application suitable for caching by identifying certain ones of the data elements for caching to improve at least one of performance and throughput of the system based on mapping the non-functional requirements of the system running the application to the resource utilization and system performance metric values corresponding to each of the plurality of caching parameters for each of the data elements;

generate a data element caching decision recommendation for the application based on the caching decision identifying the certain ones of the data elements for caching to improve the at least one of the performance and the throughput of the system; and output the data element caching decision recommendation corresponding to the application identifying the certain ones of the data elements for caching to improve the at least one of the performance and the throughput of the system to a client device of a customer via a network.

11. The computer system of claim 10, wherein the processor further executes the program instructions to:

receive production validation feedback regarding the data element caching decision recommendation corresponding to the application from the client device of the customer via the network after implementation in the system running the application;

determine whether the production validation feedback received from the customer was negative; and store the data element caching decision recommendation corresponding to the application in a database in response to determining that the production validation feedback received from the customer was not negative.

12. The computer system of claim 11, wherein the processor further executes the program instructions to:

perform a set of action steps that includes at least one of highlighting portions of audit logs corresponding to the system running the application where potential issues exist so that a program developer can determine possible code rebuild of the application or reevaluating the resource utilization and system performance metric values corresponding to each of the plurality of caching parameters to generate a new data element caching decision for the application in response to determining that the production validation feedback received from the customer was negative.

13. The computer system of claim 10, wherein the processor further executes the program instructions to:

receive a request from the client device of the customer via the network to identify data elements of a plurality of data elements corresponding to the application running on the system in a production environment suitable for caching to improve the at least one of the performance and the throughput of the system in response to the customer identifying an issue with a service provided to users by the application;

retrieve audit logs corresponding to the system running the application from an audit log database in response to receiving the request; and perform an analysis of the audit logs corresponding to the system running the application to identify historical caching of the plurality of data elements corresponding to the application.

14. The computer system of claim 13, wherein the processor further executes the program instructions to:

identify the data elements suitable for caching based on the analysis of the audit logs corresponding to the system running the application; and determine the resource utilization and system performance metric values corresponding to each of the plurality of caching parameters for each of the data elements suitable for caching based on the analysis of the audit logs corresponding to the system running the application.

15. A computer program product for managing data element caching, the computer program product comprising a computer-readable storage medium having program instructions embodied therewith, the program instructions executable by a computer to cause the computer to:

map non-functional requirements of a system running an application to resource utilization and system performance metric values corresponding to each of a plurality of caching parameters for each of data elements corresponding to the application suitable for caching in response to performing an automated code analysis of the application;

generate a caching decision for each of the data elements corresponding to the application suitable for caching by identifying certain ones of the data elements for caching to improve at least one of performance and throughput of the system based on mapping the non-functional requirements of the system running the application to the resource utilization and system performance metric values corresponding to each of the plurality of caching parameters for each of the data elements;

generate a data element caching decision recommendation for the application based on the caching decision identifying the certain ones of the data elements for caching to improve the at least one of the performance and the throughput of the system; and output the data element caching decision recommendation corresponding to the application identifying the certain ones of the data elements for caching to improve the at least one of the performance and the throughput of the system to a client device of a customer via a network.

16. The computer program product of claim 15, wherein the program instructions further cause the computer to:

receive production validation feedback regarding the data element caching decision recommendation corresponding to the application from the client device of the customer via the network after implementation in the system running the application;

determine whether the production validation feedback received from the customer was negative; and store the data element caching decision recommendation corresponding to the application in a database in response to determining that the production validation feedback received from the customer was not negative.

17. The computer program product of claim 16, wherein the program instructions further cause the computer to:

perform a set of action steps that includes at least one of highlighting portions of audit logs corresponding to the system running the application where potential issues exist so that a program developer can determine possible code rebuild of the application or reevaluating the resource utilization and system performance metric values corresponding to each of the plurality of caching parameters to generate a new data element caching decision for the application in response to determining that the production validation feedback received from the customer was negative.

18. The computer program product of claim 15, wherein the program instructions further cause the computer to:

receive a request from the client device of the customer via the network to identify data elements of a plurality of data elements corresponding to the application running on the system in a production environment suitable for caching to improve the at least one of the performance and the throughput of the system in response to the customer identifying an issue with a service provided to users by the application;

retrieve audit logs corresponding to the system running the application from an audit log database in response to receiving the request; and perform an analysis of the audit logs corresponding to the system running the application to identify historical caching of the plurality of data elements corresponding to the application.

19. The computer program product of claim 18, wherein the program instructions further cause the computer to:

identify the data elements suitable for caching based on the analysis of the audit logs corresponding to the system running the application; and determine the resource utilization and system performance metric values corresponding to each of the plurality of caching parameters for each of the data elements suitable for caching based on the analysis of the audit logs corresponding to the system running the application.

20. The computer program product of claim 19, wherein the plurality of caching parameters includes at least one of cache refresh overhead, dirty read tolerance, cached data volatility, caching parameter frequency of usage, or resource utilization for caching.

* * * * *